(12) United States Patent
Yorozuya et al.

(10) Patent No.: US 11,549,875 B2
(45) Date of Patent: Jan. 10, 2023

(54) GAS DIFFUSION SIMULATION METHOD AND APPARATUS THEREFOR

(71) Applicant: Panasonic Intellectual Property Management Co., Ltd., Osaka (JP)

(72) Inventors: Misa Yorozuya, Osaka (JP); Keiichi Yamamoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 349 days.

(21) Appl. No.: 16/747,263

(22) Filed: Jan. 20, 2020

(65) Prior Publication Data

US 2020/0150014 A1 May 14, 2020

Related U.S. Application Data

(63) Continuation of application No. PCT/JP2019/014462, filed on Apr. 1, 2019.

(30) Foreign Application Priority Data

Apr. 26, 2018 (JP) .............................. JP2018-085362
May 7, 2018 (JP) .............................. JP2018-089517

(51) Int. Cl.
*G01N 13/00* (2006.01)
*G06F 30/20* (2020.01)
(Continued)

(52) U.S. Cl.
CPC .............. *G01N 13/00* (2013.01); *G06F 17/11* (2013.01); *G06F 30/20* (2020.01);
(Continued)

(58) Field of Classification Search
CPC .. G01N 13/00; G01N 2013/003; G01N 15/08; G06F 17/11; G06F 30/20;
(Continued)

(56) References Cited

U.S. PATENT DOCUMENTS

2016/0169854 A1* 6/2016 Greathouse .......... G01N 27/041
702/27

FOREIGN PATENT DOCUMENTS

| JP | 2015-135790 | 7/2015 |
| JP | 2017-130306 | 7/2017 |
| JP | 2017-139158 | 8/2017 |

OTHER PUBLICATIONS

Jurgen Becker, et al., "A multi-scale approach to material modeling of fuel cell diffusion media," International Journal of Heat and Mass Transfer 54, pp. 1360-1368 (Year: 2011).*
(Continued)

*Primary Examiner* — Steven W Crabb
(74) *Attorney, Agent, or Firm* — McDermott Will & Emery LLP

(57) ABSTRACT

A gas diffusion simulation method for simulating diffusion of a gas in a porous material having many pores, the method includes: calculating, in the pores, a Knudsen diffusion coefficient based on the mean square displacement of first gas particles in spaces surrounded by wall surfaces and a Knudsen diffusion term using the Knudsen diffusion coefficient, calculating an interdiffusion term using an interdiffusion coefficient between the first gas particles and second gas particles different therefrom, and performing simulation of the gas diffusion of the first gas particles by using a diffusion equation of the first gas particles represented by the sum of the Knudsen diffusion term and the interdiffusion term.

4 Claims, 4 Drawing Sheets

(51) Int. Cl.
*G06F 17/11* (2006.01)
*G06F 113/08* (2020.01)
*G06F 111/10* (2020.01)

(52) U.S. Cl.
CPC .... *G01N 2013/003* (2013.01); *G06F 2111/10* (2020.01); *G06F 2113/08* (2020.01)

(58) Field of Classification Search
CPC .. G06F 2111/10; G06F 2113/08; G06F 30/25; G06F 30/23; G06F 30/27; G06F 30/28; G06F 2111/00; G06F 2119/22; Y02E 60/50; H01M 4/86
See application file for complete search history.

(56) References Cited

OTHER PUBLICATIONS

Neils Hansen et al., "Multiscale Approaches for Modeling Hydrocarbon Conversion Reactions in Zeolites," Chemie Ingenieur Technik 2013, 85, No. 4, 413-419 (Year: 2013).*

The Extended European Search Report dated Apr. 29, 2021 for the related European Patent Application No. 19792947.4.

Keil Frerich J Ed-Shon Taeshik et al: "Complexities in modeling of heterogeneous catalytic reactions", Computers & Mathematics With Applications, Elsevier, Amsterdam, NL, vol. 65, No. 10, Jan. 3, 2013 (Jan. 3, 2013), pp. 1674-1697, XP028556589.

Masashi Kishimoto et al: "Quantitative evaluation of solid oxide fuel cell porous anode microstructure based on focused ion beam and scanning electron microscope technique and prediction of anode overpotentials", Journal of Power Sources, Elsevier SA, CH, vol. 196, No. 10, Dec. 28, 2010 (Dec. 28, 2010), pp. 4555-4563, XP028185628.

International Search Report of PCT application No. PCT/JP2019/014462 dated May 21, 2019.

Stefan A. Reinecke et al., "Knudsen diffusion, gas permeability, and water content in an unconsolidated porous medium", Water Resources Research, vol. 38, No. 12, 1280, doi:10.1029/2002WR001278, Dec. 7, 2002.

* cited by examiner

GAS DIFFUSION SIMULATION METHOD AND APPARATUS THEREFOR

BACKGROUND

1. Technical Field

The present disclosure relates to a gas diffusion simulation method and an apparatus therefor and more particularly relates to a gas diffusion simulation method for simulating diffusion of a gas in a porous material and an apparatus therefor.

2. Description of the Related Art

For example, as a gas diffusion simulation method for simulating diffusion of a gas in a porous material, simulation methods disclosed in PTL 1 (Japanese Unexamined Patent Application Publication No. 2017-130306) and NPL 1 (WATER RESOURCE RESEARCH, 2002, Vol. 38, No. 12, 16-1-16-5 "Knudsen diffusion, gas permeability, and water content in an unconsolidated porous medium") have been known.

In the simulation method disclosed in PTL 1, the structure of a catalyst layer of a fuel cell is read, and a gas concentration distribution in this structure is calculated. In addition, an interdiffusion coefficient is obtained by Boltzmann equation so as to coincide with this gas concentration distribution, and the diffusion of a gas in the catalyst layer is simulated based on this interdiffusion coefficient.

In addition, in NPL 1, by a Dusty gas model using interdiffusion caused by collision between various types of gas particles and Knudsen diffusion caused by collision of gas particles with pore walls, the diffusion of a gas in a porous material is obtained.

SUMMARY

The present disclosure aims to provide a gas diffusion simulation method capable of highly precisely simulating diffusion of a gas in a porous material in a short time and an apparatus therefor.

A gas diffusion simulation method according one aspect of the present disclosure is a gas diffusion simulation method for simulating diffusion of a gas in a porous material having many pores, the method includes: calculating, in the pores, a Knudsen diffusion coefficient based on the mean square displacement of first gas particles in spaces surrounded by wall surfaces and a Knudsen diffusion term using the Knudsen diffusion coefficient, calculating an interdiffusion term using an interdiffusion coefficient between the first gas particles and second gas particles different therefrom, and performing simulation of the gas diffusion of the first gas particles by using a diffusion equation of the first gas particles represented by the sum of the Knudsen diffusion term and the interdiffusion term.

A gas diffusion simulation apparatus according to another aspect of the present disclosure is a gas diffusion simulation apparatus including: a memory that stores instructions; and a processor that, when executing the instructions stored in the memory, performs operations including: calculating, in the pores, a Knudsen diffusion coefficient based on the mean square displacement of first gas particles in spaces surrounded by wall surfaces and a Knudsen diffusion term using the Knudsen diffusion coefficient, calculating an interdiffusion term using an interdiffusion coefficient between the first gas particles and second gas particles different therefrom, and performing simulation of the diffusion of the first gas particles by using a diffusion equation of the first gas particles represented by the sum of the Knudsen diffusion term and the interdiffusion term.

According to the present disclosure, by the gas diffusion simulation method and the apparatus therefor, an advantage in that the diffusion of a gas in a porous material can be highly precisely simulated in a short time is obtained.

The above aims, other aims, features, and advantages of the present disclosure will be apparent from detailed description of the following preferable embodiment with reference to attached drawings.

Figure 1:
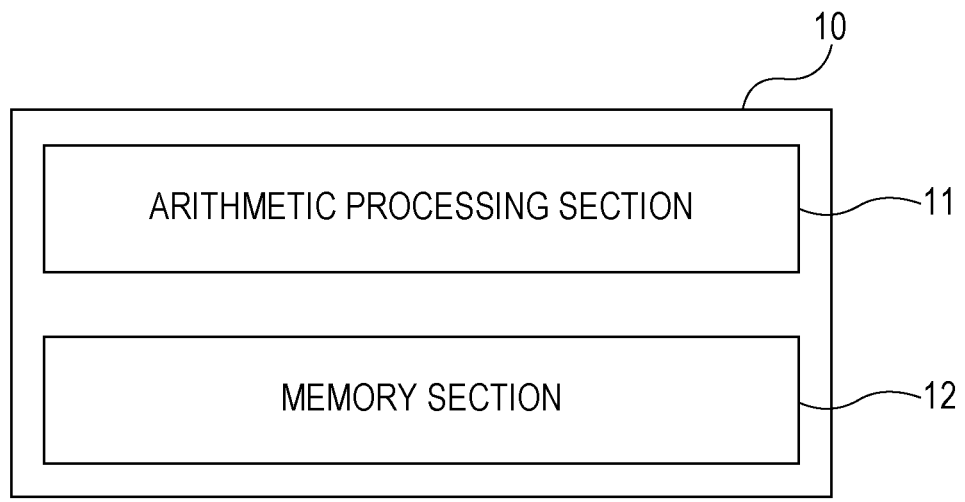
FIG. 1 is a function block diagram showing a gas diffusion simulation apparatus according to an embodiment 1 of the present disclosure.

DETAILED DESCRIPTION (Underlying Knowledge Forming Basis of the Present Disclosure)

The present inventors performed research on a highly precise simulation of diffusion of a gas in a porous material which is performed in a short time. As a result, the present inventors found that the related techniques had the following problems.

In pores of a porous material, while gas particles collide with pore walls and collide with particles of at least one different type of gas, the gas diffuses. In the gas diffusion as described above, by the method disclosed in PTL 1, the collision with the pore walls and the collision between the gas particles are combined with each other, and a gas diffusion simulation is performed by Boltzmann equation. Hence, the gas diffusion simulation takes a long time.

In addition, according to the method disclosed in NPL 1, in the calculation of the Knudsen diffusion coefficient by collision between gas particles and the pore walls, the pores of the porous material are each assumed to have a uniform cylindrical linear shape. However, this assumption is different from actual pores, and hence, the precision of the gas diffusion simulation using this Knudsen diffusion coefficient is inferior.

Accordingly, the present inventors found that when a diffusion equation represented by the sum of an interdiffusion term and a Knudsen diffusion term based on the mean square displacement of first gas particles in spaces surrounded by wall surfaces is used, a gas diffusion simulation can be highly precisely performed in a short time. The present disclosure was made based on the finding described above.

A gas diffusion simulation method according to a first aspect of the present disclosure is a gas diffusion simulation method for simulating diffusion of a gas in a porous material having many pores, the method includes: calculating, in the pores, a Knudsen diffusion coefficient based on the mean square displacement of first gas particles in spaces surrounded by wall surfaces and a Knudsen diffusion term using the Knudsen diffusion coefficient, calculating an interdiffusion term using an interdiffusion coefficient between the first gas particles and second gas particles different therefrom, and performing simulation of the gas diffusion of the first gas particles by using a diffusion equation of the first gas particles represented by the sum of the Knudsen diffusion term and the interdiffusion term.

Accordingly, since the Knudsen diffusion coefficient based on the mean square displacement of the first gas particles in the spaces surrounded by the wall surfaces is obtained, a highly precise gas diffusion simulation based on an actual porous material can be performed. In addition, since the diffusion equation of the first gas particles represented by the sum of the Knudsen diffusion term and the interdiffusion term is used, the gas diffusion simulation can be performed in a short time.

In a gas diffusion simulation method according to a second aspect of the present disclosure, in the pores according to the first aspect, the spaces surrounded by the wall surfaces may be defined by positional information of the wall surfaces of the pores. Accordingly, the diffusion of the gas in the spaces surround by actual wall surfaces can be highly precisely simulated.

In a gas diffusion simulation method according to a third aspect of the present disclosure, in the first aspect or the second aspect, the wall surfaces of the pores may be formed at least from surfaces of wall portions of the porous material surrounding peripheries of the pores. Accordingly, the diffusion of the gas in the pores, the peripheries of which are surrounded by the wall portions of the porous material, can be simulated.

In a gas diffusion simulation method according to a fourth aspect of the present disclosure, in the third aspect, the positional information of the wall surfaces of the pores may be identified by shape information of the wall portions of the porous material surrounding the peripheries of the pores. Accordingly, the gas diffusion simulation based on the shapes of the wall portions to be simulated can be highly precisely simulated.

In a gas diffusion simulation method according to a fifth aspect of the present disclosure, in the first aspect or the third aspect, the wall surfaces of the pores may be formed at least from surfaces of liquid water in the pores. Accordingly, a highly precise gas diffusion simulation in consideration of the liquid water in the pores can be simulated.

In a gas diffusion simulation method according to a sixth aspect of the present disclosure, in the fifth aspect, the positional information of the wall surfaces of the pores may be identified by the shape information of the wall portions of the porous material surrounding the peripheries of the pores and a saturation degree of the liquid water occupied in the pores. Accordingly, since the positional information of the wall surfaces can be obtained without performing experiments or the like, the gas diffusion simulation can be performed in a short time.

A gas diffusion simulation apparatus according to a seventh aspect of the present disclosure comprises: a gas diffusion simulation apparatus including: a memory that stores instructions; and a processor that, when executing the instructions stored in the memory, performs operations including: calculating, in the pores, a Knudsen diffusion coefficient based on the mean square displacement of first gas particles in spaces surrounded by wall surfaces and a Knudsen diffusion term using the Knudsen diffusion coefficient, calculating an interdiffusion term using an interdiffusion coefficient between the first gas particles and second gas particles different therefrom, and performing simulation of the diffusion of the first gas particles by using a diffusion equation of the first gas particles represented by the sum of the Knudsen diffusion term and the interdiffusion term.

Hereinafter, the embodiment of the present disclosure will be particularly described with reference to the drawings. In addition, hereinafter, through all the drawings, elements equivalent and similar to each other are designated by the same reference numeral, and duplicated description thereof will be omitted.

EMBODIMENT

<Structure of Gas Diffusion Simulation Apparatus>

A gas diffusion simulation apparatus 10 according to an embodiment 1 of the present disclosure is, as shown in FIG. 1, an apparatus for predicting diffusion of a gas in a porous material. As this porous material, for example, there may be mentioned a gas diffusion layer, a catalyst layer, and the like, each of which is used for a fuel cell stack. Hence, although being used as a gas diffusion simulation apparatus in a fuel cell, the gas diffusion simulation apparatus 10 is not limited thereto.

The gas diffusion simulation apparatus 10 includes an arithmetic processing section 11 and a memory section 12 and is formed, for example, by a computer. For example, as the arithmetic processing section 11, a processor, such as a CPU, may be mentioned, and as the memory section 12, for example, a memory which can be accessed by the arithmetic processing section 11 may be mentioned.

In the memory section 12, a gas diffusion program for simulating diffusion of a gas in a porous material and information necessary therefor are stored. In addition, the gas diffusion program and the information necessary therefor are not limited to those stored in the memory embedded in the computer and may be those input by an input device and/or received through a network.

Since reading and executing software, such as the gas diffusion program, stored in the memory section 12, the arithmetic processing section 11 simulates the diffusion of a gas in a porous material. The gas diffusion simulation apparatus 10 may be formed from a single apparatus or may be formed from a plurality of apparatuses which are cooperative with each other.

<Structure of Porous Material>

Figure 2:
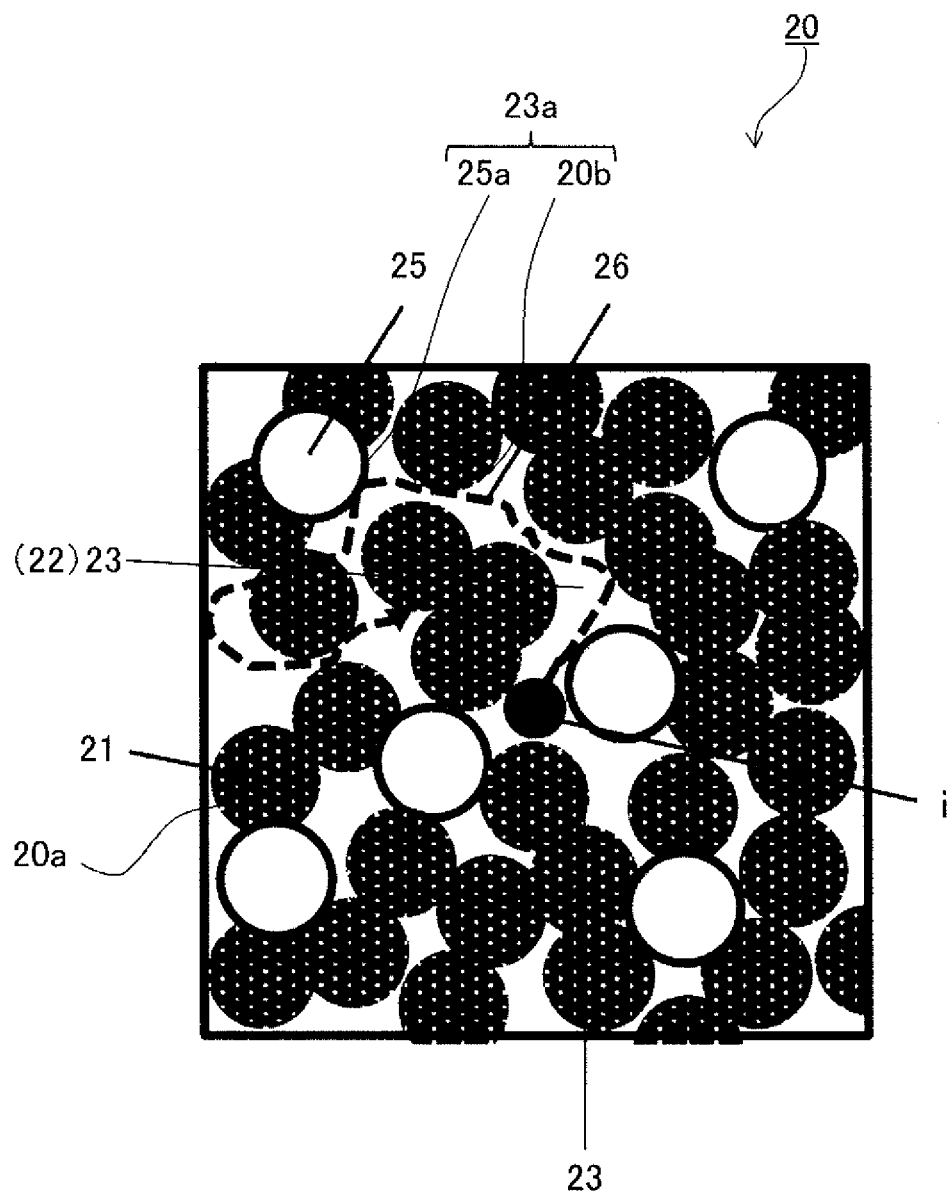
FIG. 2 is a cross-sectional view schematically showing a porous material used for a gas diffusion simulation method.

A porous material 20 shown in FIG. 2 to be processed by gas diffusion simulation will be described. In the porous material 20, wall portions 21 and many pores 22 are provided. The wall portions 21 are formed, for example, from an organic material, such as a resin and carbon, an inorganic material, such as glass, and a mixture thereof.

The pores 22 are spaces, the peripheries of which are surrounded by the wall portions 21, and are defined by all surfaces (pore surfaces 20a) of the wall portions 21 surrounding the peripheries of the pores 22. In the pores 22, spaces (diffusion spaces 23) in which gas particles are movable are provided. For example, in the case of a fuel cell, as the gas particles, hydrogen, oxygen, nitrogen, and the like may be mentioned by way of example.

When water (liquid water) in the form of liquid is not disposed in the pores 22, the gas particles are movable in all the pores 22, and hence, the diffusion spaces 23 thereof are equal to the pores 22. Hence, the diffusion spaces 23 are defined by all the surfaces (pore surfaces 20a) of the wall portions 21 surrounding the peripheries of the pores 22. Wall surfaces (defining wall surfaces 23a) defining the diffusion spaces 23 are formed by the pore surfaces 20a.

On the other hand, when liquid water 25 is disposed in the pores 22, since the gas particles are movable in spaces obtained by subtracting the volume of the liquid water 25 from the pores 22, the spaces of the pores 22 other than the volume of the liquid water 25 are the diffusion spaces 23. Hence, the diffusion spaces 23 are defined by the surfaces of the wall portions 21 of the porous material 20 and the surfaces of the liquid water 25. Of all the surfaces (pore surfaces 20a) of the wall portions 21 surrounding the peripheries of the pores 22, the defining wall surfaces 23a of the diffusion spaces 23 are formed from surfaces (porous material surfaces 20b) exposing to the diffusion spaces 23 and surfaces (liquid water surfaces 25a) of the liquid water 25 exposing to the diffusion spaces 23.

Furthermore, when the amount of the liquid water 25 disposed in the pores 22 is increased, the surfaces of the wall portions 21 surrounding the peripheries of the pores 22 are covered with the liquid water 25. In this case, the diffusion spaces 23 are defined by the surfaces of the liquid water 25 in the pores 22. The defining wall surfaces 23a are formed of the liquid water surfaces 25a.

As described above, the diffusion spaces 23 are formed of at least one of the surfaces of the wall portions 21 in the pores 22 and the surfaces of the liquid water 25. Hence, the defining wall surfaces 23a of the diffusion spaces 23 are formed of at least one of the porous material surfaces 20b (pore surfaces 20a) and the liquid water surfaces 25a.

That is, when the wall portions 21 are exposed to the diffusion spaces 23, the wall surfaces (defining wall surfaces 23a) of the pores 22 include the surfaces (porous material surfaces 20b) of the wall portions 21 of the porous material 20 surrounding the peripheries of the pores 22. This porous material surface 20b is a part or the entire of the pore surface 20a. In addition, when the liquid water 25 is exposed to the diffusion spaces 23, the wall surfaces (defining wall surfaces 23a) of the pores 22 include the surfaces (liquid water surfaces 25a) of the liquid water 25 in the pores 22.

In the diffusion spaces 23, gas particles (first gas particles i) move along a route 26 shown by a dotted line, and hence, the gas diffuses. This diffusion includes a diffusion (Knudsen diffusion) in which the first gas particles i move while colliding with the defining wall surfaces 23a of the diffusion spaces 23 and a diffusion (interdiffusion) in which the first gas particles i move while colliding with gas particles (second gas particles j) different from the first gas particles i. Hence, in consideration of the Knudsen diffusion and the interdiffusion, the gas diffusion in the porous material 20 is simulated.

<Gas Diffusion Simulation Method>

Figure 3:
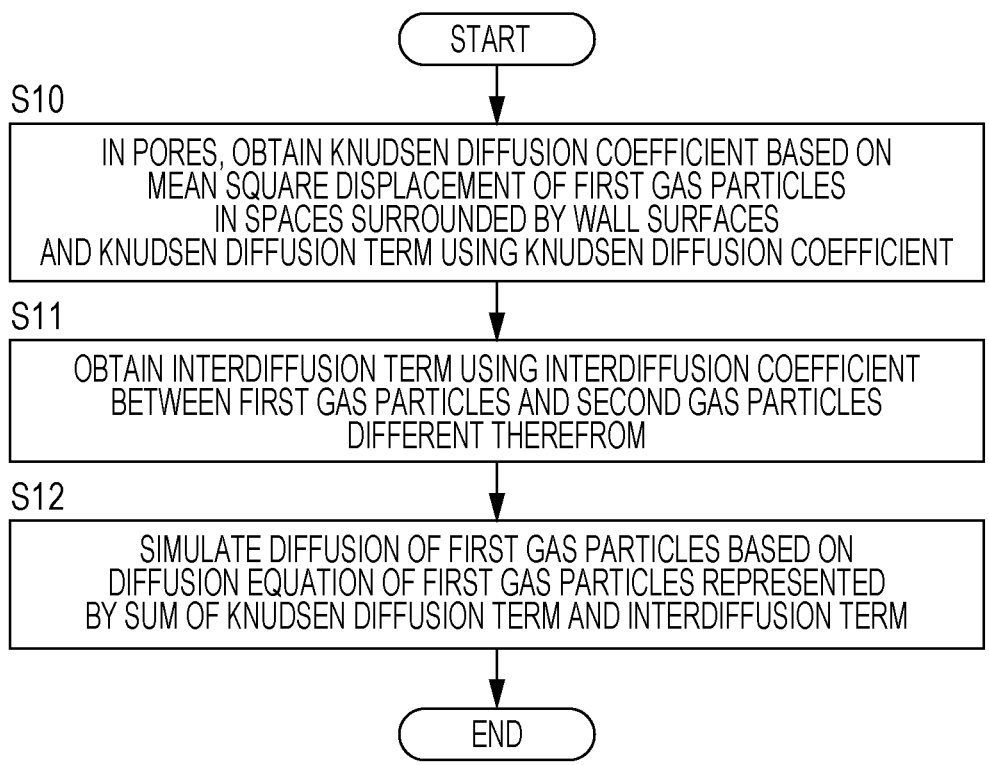
FIG. 3 is a flowchart showing the gas diffusion simulation method.

A gas diffusion simulation method is performed, for example, along a flowchart shown in FIG. 3 by the gas diffusion simulation apparatus 10. Hereinafter, the diffusion of a gas in the porous material 20 shown in FIG. 2 will be simulated.

The arithmetic processing section 11 of the gas diffusion simulation apparatus 10 obtains, in the pores 22, a Knudsen diffusion coefficient based on the mean square displacement of the first gas particles i in the spaces (diffusion spaces 23) surrounded by the wall surfaces and a Knudsen diffusion term using the Knudsen diffusion coefficient (Step S10).

This Knudsen diffusion coefficient $D_k^{\mathit{eff}}(s,t)$ is represented, for example, by the following equation 3. In this case, MSD(s,t) is the mean square displacement of the first gas particles i.

[Math. 1]

$$D_k^{\mathit{eff}}(s, t) = \frac{\partial}{\partial t}\left(\frac{1}{6} MSD(s, t)\right) \quad \text{(Equation 3)}$$

The Knudsen diffusion term $\nabla x_i^k$ is represented, for example, by the following equation 4. In this case, $x_i^k$ is a molar fraction of the first gas particles i involved in the Knudsen diffusion. $D_k^{\mathit{eff}}(s)$ is an effective Knudsen diffusion coefficient and is determined by the Knudsen diffusion coefficient $D_k^{\mathit{eff}}(s,t)$ represented by the equation 3. $v_i$ is a velocity [m/sec] of the first gas particles i.

[Math. 2]

[Math. 2]

$$\nabla x_i^k = -\frac{1}{D_k^{\mathit{eff}}(s)}\vec{v}_i \quad \text{(Equation 4)}$$

In addition, the arithmetic processing section 11 obtains an interdiffusion term $\nabla x_i^m$ using an interdiffusion coefficient between the first gas particles i and the second gas particles j different from the first gas particles i (Step S11).

Based on a molecular diffusion of a multicomponent gas, this interdiffusion term $\nabla x_i^m$ is represented by the following equation 6 of Stefan-Maxwell law. In the equation 6, $x_i^m$ represents a molar fraction of the first gas particles i involved in the interdiffusion, $x_i$ represents a molar fraction of the first gas particles i, $x_j$ represents a molar fraction of the second gas particles j, and $v_j$ represents a velocity [m/sec] of the second gas particles j. $D_{ij}$ represents the interdiffusion coefficient [m²/sec] and is determined beforehand in combination between the first gas particles i and the second gas particles j by experiments or the like.

[Math. 3]

[Math. 3]

$$\nabla x_i^m = \sum_{j(i \neq j)} \frac{x_i x_j}{D_{ij}}(\vec{v}_j - \vec{v}_i) \quad \text{(Equation 6)}$$

In addition, based on the diffusion equation of the first gas particles i represented by the sum of the Knudsen diffusion term and the interdiffusion term, the arithmetic processing section 11 simulates the diffusion of the first gas particles i (Step S12). For example, from the sum of the Knudsen diffusion term $\nabla x_i^k$ and the interdiffusion term $\nabla x_i^m$, the diffusion equation of Dusty gas model represented by the following equation 8 is obtained.

[Math. 4]

$$\nabla x_i = \nabla x_i^m + \nabla x_i^k \quad \text{(Equation 8)}$$

The arithmetic processing section 11 executes the gas diffusion simulation based on the diffusion equation represented by the following equation 9 and is able to simulate the diffusion of the gas in the porous material 20. The equation 9 is obtained by substituting the Knudsen diffusion term $\nabla x_i^k$ represented by the equation 4 and the interdiffusion term $\nabla x_i^m$ represented by the equation 6 in the equation 8.

[Math. 5]

$$\nabla x_i = \sum_{j(i \neq j)} \frac{x_i x_j}{D_{ij}} (\vec{v}_j - \vec{v}_i) - \frac{1}{D_k^{eff}(s)} \vec{v}_i \quad \text{(Equation 9)}$$

Concrete Examples

Figure 4:
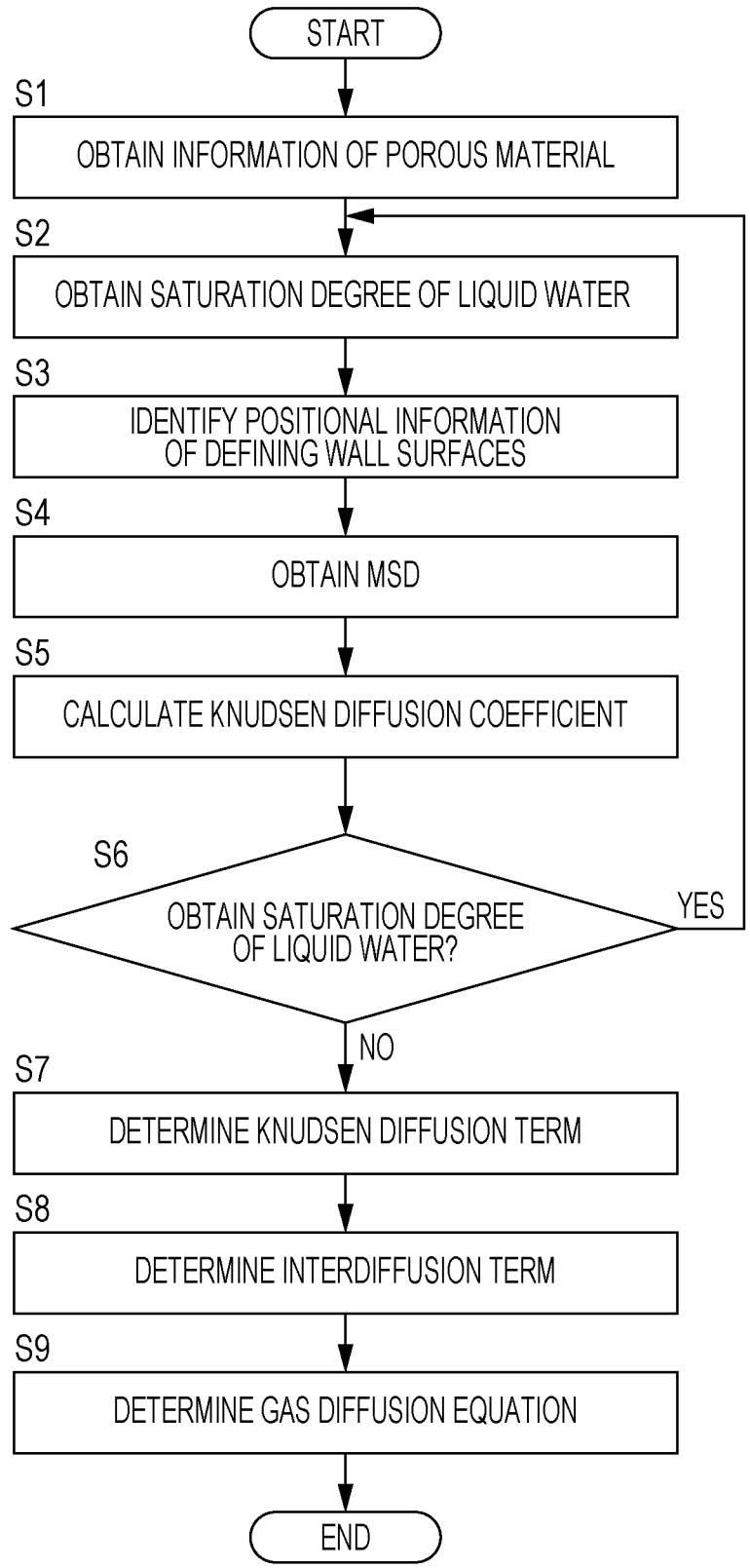
FIG. 4 is a flowchart showing one example of the gas diffusion simulation method.

In more particular, the gas diffusion simulation method is executed along a flowchart shown in FIG. 4. In this case, in the pores 22, the spaces (diffusion spaces 23) surrounded by the wall surfaces are defined by positional information of the wall surfaces (defining wall surfaces 23a) of the pores 22.

The wall surfaces (defining wall surfaces 23a) of this pores 22 are formed of the surfaces (pore surfaces 20a (porous material surfaces 20b)) of the wall portions 21 of the porous material 20 surrounding the peripheries of the pores 22. In this case, the positional information of the wall surfaces of the pores 22 is identified by shape information of the wall portions 21 of the porous material 20 surrounding the peripheries of the pores 22.

In addition, the wall surfaces (defining wall surfaces 23a) of the pores 22 are formed by the surfaces (liquid water surfaces 25a) of the liquid water 25 in the pores 22. In this case, the positional information of the wall surfaces of the pores 22 is identified by the shape information of the wall portions 21 of the porous material 20 surrounding the peripheries of the pores 22 and a saturation degree of the liquid water 25 occupied in the pores 22.

Hence, the arithmetic processing section 11 obtains information of the porous material 20 which is an object of the gas diffusion simulation (Step S1). The information of this porous material 20 includes at least the shape information of the wall portions 21 of the porous material 20 and may further include material information of the wall portions 21. For example, as the material information of the wall portions 21, the contact angle of the liquid water 25 to the wall portion 21 and the like may be mentioned by way of example and are determined in advance by experiments or the like.

The shape information of the wall portions 21 can be obtained from image information of the porous material 20. For example, by the use of a FIB-SEM (Focused Ion Beam-Scanning Electron Microscope), cross-sectional images are continuously taken at different positions along a predetermined direction with respect to the porous material 20. An image (laminate image) obtained by lamination of the cross-sectional images thus taken is treated by an image processing for binarization. Accordingly, a simulation computational mesh including positional information of the pore surfaces 20a is formed as the shape information of the wall portions 21.

Subsequently, the arithmetic processing section 11 obtains a saturation degree (saturation degree sn of the liquid water 25) of the liquid water 25 occupied in the pores 22 (Step S2). In addition, in the gas diffusion simulation method shown in FIG. 4, at least one saturation degree is obtained. The saturation degree sn (=s1 . . . ) of the liquid water 25 indicates the saturation degree of the liquid water 25 obtained at an $n^{th}$ time (n is a natural integer).

In addition, based on the information of the porous material 20 in Step S1, and the saturation degree sn of the liquid water 25 in Step S2, the arithmetic processing section 11 identifies the positional information of actual defining wall surfaces 23a (Step S3). In this case, first, from the saturation degree sn of the liquid water 25 and the information (the material information of the wall portions 21 and the shape information of the wall portions 21) of the porous material 20, positional information of the liquid water 25 distributed in the pores 22 is obtained.

For example, the positional information of the liquid water 25 can be determined by a pore morphology method in which the liquid water 25 is packed based on Young-Laplace equation. In particular, first, by the material information and the pressure (capillary pressure) of the wall portions 21, the radius of the space in which the liquid water 25 is able to stay in the porous material 20 is determined by Young-Laplace equation (Equation 1). In the equation 1, $p_c$ represents the capillary pressure [Pa], and γ represents the surface tension [N/m] of the liquid water 25. In addition, θ represents the contact angle [°] of the liquid water 25 with respect to the wall portion 21. Those are obtained from the material information of the wall portions 21. r represents the radius [m] of the space.

[Math. 6]

$$p_c = \frac{2\gamma \cos\theta}{r} \quad \text{(Equation 1)}$$

At a predetermined $p_c$ value, the liquid water 25 is packed in a space having a radius r, and the positions of the liquid water 25 in the pores 22 of the porous material 20 are determined. In addition, the $p_c$ value is changed, and the positional information of the liquid water 25 distributed in the pores 22 is sequentially obtained.

Accordingly, from the positional information of this liquid water 25 and the positional information of the pore surfaces 20a in S1, the positional information of the defining wall surfaces 23a is obtained. As a result, the diffusion spaces 23 of the first gas particles i are determined. In addition, the relationship of the information of the porous material 20 and the saturation degree sn of the liquid water 25 with the positional information of the defining wall surfaces 23a is determined in advance, and by the use of this relationship, the positional information of the defining wall surfaces 23a may be obtained.

Subsequently, the arithmetic processing section 11 obtains the mean square displacement (MSD) of the first gas particles i in the diffusion spaces 23 determined by the positional information of the defining wall surfaces 23a (Step S4). In the diffusion space 23 based on the positional information of the defining wall surface 23a, the mean square displacement is the square of moving distance of a particle from an initial position at a certain time t and is represented by the following equation 2.

In the equation 2, MSD(s,t) is the mean square displacement [m²] at a saturation degree s of the liquid water 25 and at a time t. $a_i(t)$ represents a coordinate position of the first gas particle i at a time t in an a direction, $b_i(t)$ represents a coordinate position of the first gas particle i at the time t in a b direction, and $c_i(t)$ represents a coordinate position of the first gas particle i at the time t in a c direction. t represents the time [sec]. In addition, the a direction, the b direction, and the c direction are directions orthogonal to each other. In addition, the saturation degree s is a representative value of the saturation degree sn.

[Math. 7]

$$MSD(s,t)=(a_i(t)-a_i(0))^2+(b_i(t)-b_i(0))^2+(c_i(t)-c_i(0))^2 \quad \text{(Equation 2)}$$

The position ($a_i(t)$, $b_i(t)$, $c_i(t)$) of the first gas particle i at the time t is determined, for example, in such a way that after the center of the porous material 20 is disposed at the initial position, the first gas particle i is allowed to randomly walk. In addition, the first gas particle i is assumed to be scattered, for example, by mirror reflection, isotropic scattering, and a cos θ law.

In addition, besides the method described above, the mean square displacement may also be obtained using a molecular dynamics method. In this case, the mean square displacement can be obtained in consideration of, besides the scattering of the first gas particle i, adsorption of the first gas particle i to the defining wall surface 23a.

The arithmetic processing section 11 calculates a Knudsen diffusion coefficient $D_k^{eff}(sn,t)$ from the mean square displacement MSD(sn,t) of the first gas particle i (Step S5). The Knudsen diffusion coefficient $D_k^{eff}(sn,t)$ is a Knudsen diffusion coefficient at the saturation degree sn of the liquid water 25 and is calculated, for example, from MSD(sn,t) represented by the above equation 2 using the above equation 3.

In the equation 3, $D_k^{eff}(sn,t)$ represents a Knudsen diffusion coefficient [m²/sec] at the saturation degree sn of the liquid water 25 and at the time t. Although a time differential value of MSD(sn,t) represented by the equation 3 is changed from time to time, after a sufficiently long time passes, the time differential value described above is converged to a certain constant value in a stable equilibrium state. For example, in a graph in which MSD(sn,t) corresponding to the saturation degree sn of the liquid water 25 is plotted along a vertical axis, and the time t is plotted along a horizontal axis, after a sufficiently long time passes, an approximately straight line is obtained. From the slope of this straight line and the equation 3, the Knudsen diffusion coefficient $D_k^{eff}(sn)$ at the saturation degree sn of the liquid water 25 is obtained.

The arithmetic processing section 11 judges whether the saturation degree sn of the liquid water 25 is further obtained or not (Step S6). The saturation degree sn of the liquid water 25 is set in a range of 0 to 1. A saturation degree sn of 0 of the liquid water 25 indicates the state in which the liquid water 25 is not disposed in the pores 22, and a saturation degree sn of 1 of the liquid water 25 indicates the state in which the liquid water 25 is filled in the pores 22.

For the gas diffusion simulation at a predetermined saturation degree sn of the liquid water 25, one saturation degree may be obtained. Alternatively, for gas diffusion simulation at an arbitrary saturation degree, a plurality of saturation degrees may be obtained. In this case, the number of the saturation degrees to be obtained may be arbitrarily determined so that the saturation degrees are each in a range of 0 to 1.

As the number of the saturation degrees sn of the liquid water 25 to be obtained is increased, the precision of the gas diffusion simulation is improved; however, the simulation will take a long time. Hence, in consideration of the precision and the time, the number of the saturation degrees to be obtained is determined in advance. When the number of the saturation degrees sn is less than a predetermined number (Step S6: YES), the process is returned to Step S2 and is again performed from Steps S2 to S5.

On the other hand, when the number of the saturation degrees sn thus obtained reaches the predetermined number, all the saturation degrees (n) of the liquid water 25 are obtained (Step S6: NO). In this case, the Knudsen diffusion coefficient $D_k^{eff}(sn)$ is obtained at each saturation degree sn. From those n Knudsen diffusion coefficients $D_k^{eff}(sn)$ (one or at least two), the arithmetic processing section 11 determines an effective Knudsen diffusion coefficient $D_k^{eff}(s)$, and the Knudsen diffusion term $\nabla x_i^k$ is obtained therefrom (Step S7).

When one Knudsen diffusion coefficient $D_k^{eff}(sn)$ is used, the effective Knudsen diffusion coefficient $D_k^{eff}(s)$ is represented by this Knudsen diffusion coefficient $D_k^{eff}(sn)$. When a plurality of Knudsen diffusion coefficients $D_k^{eff}(sn)$ is used, the effective Knudsen diffusion coefficient $D_k^{eff}(s)$ is represented by a value including the saturation degree s of the liquid water 25 as a parameter.

The Knudsen diffusion term $\nabla x_i^k$ is represented by the above equation 4, and the equation 4 is obtained by modifying the following equation 5. The equation 5 is an equation including the effective Knudsen diffusion coefficient $D_k^{eff}(s)$ in consideration of the defining wall surfaces 23a of the diffusion spaces 23 and is represented by the same form as that of Fick's diffusion.

[Math. 8]

$$\vec{v}_I = -D_k^{eff}(s) \cdot \nabla x_i^k \quad \text{(Equation 5)}$$

In addition, the arithmetic processing section 11 obtains the interdiffusion coefficient $D_{ij}$ and also obtains the interdiffusion term $\nabla x_i^m$ therefrom (Step S8). Based on the molecular diffusion of a multicomponent gas, this interdiffusion term $\nabla x_i^m$ is represented by the above equation 6 of Stefan-Maxwell law.

According to Stefan-Maxwell law, by expanding Fick's first law which indicates that diffusion of a certain component gas is influenced only by the concentration gradient of the component, the diffusion of the gas is not only influenced by the concentration gradient of the component but also by the physical quantity of another component. In addition, the interdiffusion coefficient $D_{ij}$ of a two-component bulk disclosed in the law described above can be obtained by the following equation 7 of Chapman-Enskog equation.

In the equation 7, T represents the temperature [K] of a gas. $M_i$ [kg/kmol] represents a molecular weight of the first gas particles i, and $M_j$ [kg/kmol] represents a molecular weight of the second gas particles j. p represents the pressure [kPa] of the gas. $\sigma_{ij}$ represents a characteristic diameter $[10^{-10}$ m] of the first gas particles i and the second gas particles j which collide with each other and indicates ½($\sigma_i+\sigma_j$). $\Omega_{D,ij}$ represents collision integral by Lennard-Jones potential.

[Math. 9]

$$D_{ij} = 0.1883 \times 10^{-4} \sqrt{T^3\left(\frac{1}{M_i}+\frac{1}{M_j}\right)} \frac{1}{p\sigma_{ij}^2 \Omega_{D,ij}} \quad \text{(Equation 7)}$$

Subsequently, from the sum of the Knudsen diffusion term $\nabla x_i^k$ and the interdiffusion term $\nabla x_i^m$ thus obtained, the arithmetic processing section 11 obtains a gas diffusion equation of the Dusty gas model represented by the above equation 8 (Step S9). In addition, the arithmetic processing section 11 executes the gas diffusion simulation based on the gas diffusion equation represented by the equation 9 so that the diffusion of the gas in the porous material 20 can be simulated.

In this gas diffusion simulation, the diffusion spaces 23 are defined by the positional information of the defining wall surfaces 23a of the pores 22 of an actual porous material 20. Accordingly, a highly precise gas diffusion simulation in accordance with actual pores 22 can be performed.

In addition, the defining wall surfaces 23a are formed from at least one of the porous material surfaces 20b (pore surfaces 20a) and the liquid water surfaces 25a. As described above, since the liquid water 25 is taken into consideration besides the wall portions 21 of the pores 22, the defining wall surfaces 23a used in the Knudsen diffusion term are made more similar to actual surfaces. Hence, a more highly precise gas diffusion simulation can be performed.

Furthermore, from the saturation degree (saturation degree sn of the liquid water 25) of the liquid water 25 occupied in the pores 22, the positional information of the defining wall surfaces 23a is obtained. Accordingly, the gas diffusion simulation can be performed in a short time.

That is, in NPL 1, an effective permeability of a gas is experimentally measured in the porous material 20 containing the liquid water 25, and the Knudsen diffusion coefficient is calculated using the effective permeability as a parameter. Hence, in accordance with the shape of the porous material 20, the effective permeability which is a parameter of the Knudsen diffusion coefficient is necessarily obtained by experiments, and hence, the gas diffusion simulation takes a long time.

On the other hand, in the gas diffusion simulation according to this embodiment, by the saturation degree sn of the liquid water 25, the positional information of the actual defining wall surfaces 23a is identified. The Knudsen diffusion coefficient in the diffusion spaces 23 defined by this positional information is determined. Hence, the parameter of the Knudsen diffusion coefficient in accordance with the shape of the porous material 20 is not necessarily obtained by experiments, and hence, the time required for the gas diffusion simulation can be significantly reduced.

In addition, after the Knudsen diffusion term $\nabla x_i^k$ and the interdiffusion term $\nabla x_i^m$ are obtained, by the use of the gas diffusion equation represented by the sum thereof, the gas diffusion simulation is performed. Hence, compared to the gas diffusion simulation using Boltzmann equation such as that described in PTL 1, the gas diffusion simulation can be performed in a short time.

Furthermore, in the Knudsen diffusion term $\nabla x_i^k$, the Knudsen diffusion coefficient based on the mean square displacement of the first gas particles i in the diffusion spaces 23 surrounded by the defining wall surfaces 23a is used. Accordingly, the Knudsen diffusion coefficient in actual diffusion spaces 23 can be obtained, and hence, the gas diffusion simulation can be highly precisely performed.

In addition, the structure shown in the above embodiment is described by way of example and may be appropriately changed and/or modified in some cases. For example, when the porous material 20 contains no liquid water 25, in the flowchart of the gas diffusion simulation shown in FIGS. 4, S2 and S6 may be omitted.

In the case described above, the defining wall surfaces 23a are formed of the porous material surfaces 20b (that is, the pore surfaces 20a). Hence, the positional information of the defining wall surfaces 23a is identified by shape information of the porous material surfaces 20b (pore surfaces 20a). In addition, by this positional information, the diffusion spaces 23 are defined.

In addition, in the example described above, based on the information of the porous material 20 and the saturation degree sn of the liquid water 25, the positional information of the defining wall surfaces 23a is identified. However, the method for identifying this positional information is not limited thereto.

For example, when the porous material 20 contains the liquid water 25 in the pores 22, the arithmetic processing section 11 may obtain shape information of the surfaces of the porous material 20 containing the liquid water 25 and may identify the positional information of the defining wall surfaces 23a by this shape information. In this case, when the surfaces of the wall portions 21 are partially covered with the liquid water 25, by the shape information of the porous material surfaces 20b thus obtained and shape information of the liquid water surfaces 25a, the positional information of the defining wall surfaces 23a is identified. In addition, when the surfaces of the wall portions 21 are entirely covered with the liquid water 25, by the shape information of the liquid water surfaces 25a thus obtained, the positional information of the defining wall surfaces 23a is identified.

In addition, from the above description, many improvements and other embodiments of the present disclosure are apparent to a person skilled in the art. Hence, the above description is to be understood as one example and is provided to suggest the best mode for carrying out the present disclosure to a person skilled in the art. The details of the structure and/or the function of the present disclosure may be substantially changed and/or modified without departing from the spirit thereof.

The gas diffusion simulation method of the present disclosure and the apparatus therefor are useful, for example, as a gas diffusion simulation method and an apparatus therefor, each of which can highly precisely simulate diffusion of a gas in a porous material in a short time.

What is claimed is:

1. A gas diffusion simulation method for simulating diffusion of a gas in a porous material having pores wherein wall surfaces of the pores are formed at least from surfaces of wall portions of the porous material surrounding peripheries of the pores, the method being performed by a gas diffusion simulation apparatus comprising a memory and a processor, the method comprising:
   obtaining shape information of the wall portions of the porous material surrounding the peripheries of the pores;
   identifying positional information of the wall surfaces of the pores by the shape information, the positional information defining spaces surrounded by the wall surfaces;
   calculating, by the processor, in the pores, a Knudsen diffusion coefficient based on a mean square displacement of first gas particles in the spaces surrounded by the wall surfaces and a Knudsen diffusion term using the Knudsen diffusion coefficient;
   calculating, by the processor, an interdiffusion term using an interdiffusion coefficient between the first gas particles and second gas particles different therefrom;
   obtaining, by the processor, a gas diffusion equation of the first gas particles as a sum of the Knudsen diffusion term and the interdiffusion term; and
   performing, by the processor, simulation of the gas diffusion of the first gas particles in the porous material having the pores by using the gas diffusion equation, wherein:

the Knudsen diffusion coefficient is $D_k^{eff}(s,t)$ represented by $$D_k^{eff}(s, t) = \frac{\partial}{\partial t}\left(\frac{1}{6}MSD(s, t)\right),$$

where MSD(s,t) is the mean square displacement of the first gas particles, the Knudsen diffusion term is $\nabla x_i^k$ represented by $$\nabla x_i^k = -\frac{1}{D_k^{eff}(s)}\vec{v_i},$$

where $x_i^k$ is a molar fraction of the first gas particles involved in the Knudsen diffusion, $D_k^{eff}(s)$ is an effective Knudsen diffusion coefficient determined by the Knudsen diffusion coefficient $D_k^{eff}(s,t)$, and $v_i$ is a velocity of the first gas particles,
the interdiffusion term is $\nabla x_i^m$ represented by $$\nabla x_i^m = \sum_{j(i \neq j)} \frac{x_i x_j}{D_{ij}}(\vec{v_j} - \vec{v_i}),$$

where $x_i^m$ represents a molar fraction of the first gas particles involved in the interdiffusion, $x_i$ represents a molar fraction of the first gas particles, $x_j$ represents a molar fraction of the second gas particles, $v_j$ represents a velocity of the second gas particles, and $D_{ij}$ represents an interdiffusion coefficient, and
the gas diffusion equation is represented by $$\nabla x_i = \nabla x_i^m + \nabla x_i^k.$$

2. The gas diffusion simulation method according to claim 1,
wherein the wall surfaces of the pores are formed at least from surfaces of liquid water in the pores.

3. The gas diffusion simulation method according to claim 2, comprising identifying the positional information of the wall surfaces of the pores by the shape information of the wall portions of the porous material surrounding the peripheries of the pores and a saturation degree of the liquid water occupied in the pores.

4. A gas diffusion simulation apparatus for simulating diffusion of a gas in a porous material having pores, wherein wall surfaces of the pores are formed at least from surfaces of wall portions of the porous material surrounding peripheries of the pores, the apparatus comprising:
a memory that stores instructions; and
a processor that, when executing the instructions stored in the memory, performs operations including:
obtaining shape information of the wall portions of the porous material surrounding the peripheries of the pores;
identifying positional information of the wall surfaces of the pores by the shape information, the positional information defining spaces surrounded by the wall surfaces;
calculating, in the pores, a Knudsen diffusion coefficient based on a mean square displacement of first gas particles in the spaces surrounded by the wall surfaces and a Knudsen diffusion term using the Knudsen diffusion coefficient;
calculating an interdiffusion term using an interdiffusion coefficient between the first gas particles and second gas particles different therefrom;
obtaining a gas diffusion equation of the first gas particles as a sum of the Knudsen diffusion term and the interdiffusion term; and
performing simulation of the gas diffusion of the first gas particles in the porous material having the pores by using the gas diffusion equation, wherein:
the Knudsen diffusion coefficient is $D_k^{eff}(s,t)$ represented by $$D_k^{eff}(s, t) = \frac{\partial}{\partial t}\left(\frac{1}{6}MSD(s, t)\right),$$

where MSD(s,t) is the mean square displacement of the first gas particles,
the Knudsen diffusion term is $\nabla x_i^k$ represented by $$\nabla x_i^k = -\frac{1}{D_k^{eff}(s)}\vec{v_i},$$

where $x_i^k$ is a molar fraction of the first gas particles involved in the Knudsen diffusion, $D_k^{eff}(s)$ is an effective Knudsen diffusion coefficient determined by the Knudsen diffusion coefficient $D_k^{eff}(s,t)$, and $v_i$ is a velocity of the first gas particles,
the interdiffusion term is $\nabla x_i^m$ represented by $$\nabla x_i^m = \sum_{j(i \neq j)} \frac{x_i x_j}{D_{ij}}(\vec{v_j} - \vec{v_i}),$$

where $x_i m$ represents a molar fraction of the first gas particles involved in the interdiffusion, $x_i$ represents a molar fraction of the first gas particles, $x_j$ represents a molar fraction of the second gas particles, $v_j$ represents a velocity of the second gas particles, and $D_{ij}$ represents an interdiffusion coefficient, and
the gas diffusion equation is represented by $$\nabla x_i = \nabla x_i^m + \nabla x_i^k.$$

* * * * *